United States Patent [19]

Baer et al.

[11] Patent Number: 5,447,703

[45] Date of Patent: Sep. 5, 1995

[54] PROCESS FOR COMBUSTION OF SULFUR-CONTAINING CARBONACEOUS MATERIALS

[75] Inventors: Stephen H. Baer, Bedford; Joseph Dell'Aquila, deceased, late of Flushing, both of N.Y., by Larry Dell'Aquila, executor

[73] Assignee: Novacon Energy Systems, Inc., Bedford, N.Y.

[21] Appl. No.: 80,937

[22] Filed: Jun. 22, 1993

Related U.S. Application Data

[63] Continuation-in-part of Ser. No. 908,717, Jun. 30, 1992, abandoned.

[51] Int. Cl.[6] .................. B01D 53/60; B01D 53/34
[52] U.S. Cl. ................. 423/235; 423/239.1; 423/244.07; 423/244.08; 110/342
[58] Field of Search .............. 44/603; 110/215, 216, 110/342, 347; 423/235, 239.1, 244.07, 244.08

[56] References Cited

U.S. PATENT DOCUMENTS

| | | | |
|---|---|---|---|
| 3,668,833 | 6/1972 | Cahill, Jr. ................................. 55/7 |
| 4,600,438 | 7/1986 | Harris ................................. 106/100 |
| 5,171,552 | 12/1992 | Miura et al. ..................... 423/239 |
| 5,172,644 | 12/1992 | Offen ................................. 110/345 |

FOREIGN PATENT DOCUMENTS

| | | | |
|---|---|---|---|
| 2624399 | 6/1989 | France . | |
| 3031538 | 4/1992 | Germany ..................... 423/244.08 |
| 56-76228 | 6/1981 | Japan ................................. 423/235 |
| 61-111127 | 5/1986 | Japan ................................. 423/239.1 |

WO8601528 3/1986 United Kingdom .

OTHER PUBLICATIONS

Patent Abstracts of Japan, vol. 12, No. 346 (M-742) 16 Sep. 1988 for JP-A-63 105 308 (Ebara) 10 May 1988.
Patent Abstracts of Japan, vol. 9, No. 309 (C-318) 5 Dec. 1985 for JP-A-06 147 300 (Jiyusaburou Furukawa) Aug. 1985.
Database WPI Week 8232, Derwent Publications Ltd., London, GB; AN 82-66044E for DD-A-154 307 (Kluge et al.) Mar. 10, 1982.
Colliers's Encyclopedia, vol. 15, 1962, p. 379.
McGraw-Hill Encyclopedia of Science and Technology, vol. 7, 1960, pp. 514–516.
McGraw-Hill Encyclopedia of Science and Technology, vol. 8, 1960, pp. 100–101.

*Primary Examiner*—Gary P. Straub
*Assistant Examiner*—Timothy C. Vanoy

[57] ABSTRACT

In a process for burning a combustible, sulfur-containing carbonaceous material such as coal, municipal waste, or tires, recrystallized metamorphic $CaCO_3$ is introduced into the combustion zone along with the fuel. The amount of $SO_2$ and $NO_2$ generated is substantially reduced as compared to conventional processes and, even with no post-scrubbing equipment, the emission levels compare favorably to the emission levels of state-of-the-art power plants using the same coal with extensive emission controls. The present process also acts to convert sulfur resident in coal into elemental sulfur and loose sulfur compounds and to reduce the particulate output.

12 Claims, 6 Drawing Sheets

PROCESS FOR COMBUSTION OF SULFUR-CONTAINING CARBONACEOUS MATERIALS

This application is a Continuation-In-Part of Application U.S. Serial No. 07/908,717, filed Jun. 30, 1992.

FIELD OF THE INVENTION

This invention relates to a process for burning sulfur containing carbonaceous or organic materials such as coal, rubber, and waste products. The invention has particular application in the fields of power generation and incineration of waste materials, such as municipal waste disposal.

BACKGROUND OF THE INVENTION

The major source of electricity is achieved by coal fired power plants. There are vast supplies of coal in the United States and throughout the world, and the power potentially available from coal combustion is enormous.

However, although coal is abundant and relatively inexpensive as an energy source, much of it is becoming increasingly undesirable because of the airborne emissions its produces. In particular, sulfur oxides ($SO_x$) and nitric oxides ($NO_x$), when emitted into the atmosphere, combine with moisture to create sulfuric and nitric acids, the chief components of acid rain. Still further, coal combustion also produces pollutants in the form of solid particulates.

Waste incineration likewise creates undesirable levels of $SO_x$ and $NO_x$, and of solid particulates.

Over the next decade, both generating plants and waste incinerators will be required by law to make major reductions in their levels of emissions. With the technology currently available, coal burning plants have two primary methods of reducing $SO_x$, emissions:

The first method is to burn coal with lower sulfur content. However, low sulfur coal is appreciably more expensive than medium and high sulfur coals, and it will become more so as demand increases. Further, decreasing the sulfur content has no effect on $NO_x$, emissions.

The second method for reducing $SO_x$ emissions is scrubbing, such as embodied in the process of treating the combustion flue gases with limestone and converting the $SO_x$ to calcium sulfate.

Scrubbing can be effective in reducing $SO_x$ emissions. However, scrubbing equipment is expensive to install, operate and maintain. Moreover, the power required to run the scrubbing equipment imposes substantial parasitic energy losses. When limestone is used in the combustion chamber, as it is in fluidized bed combustors (the newest and cleanest type of system), it reduces the efficiency of the combustion process itself. Finally, limestone scrubbing does not lower $NO_x$ emissions.

$NO_x$ is currently reduced in two ways:

The first way is to modify the combustion process mechanically by installing special low $NO_x$, burners. However, the capital costs are high, installation can require long shutdowns, and the degree of $NO_x$ reduction is limited.

The second way is to treat the flue gases with either ammonia or urea sprays. This, too, is effective, but the systems are expensive to operate, and ammonia can sometimes itself become a secondary pollutant.

Particulate matter is currently removed from flue gases by means of cyclone extraction, filtering, electrostatic precipitation, or a combination thereof. In such cases, the equipment is expensive to build, operate and maintain, and it imposes parasitic energy losses.

In effect, reducing the three forms of undesirable emissions, $SO_x$, $NO_x$ and particulates requires three separate processes, all of them expensive.

Waste incineration is currently facing the same type of regulatory problems as coal. Municipalities and states are insisting that $SO_x$, $NO_x$ and particulate emissions be reduced substantially below present levels and since the low sulfur fuels available to coal burning plants have no counterpart in waste incineration, scrubbing and $NO_x$ treatments are at present the only practical methods.

Discarded automobile tires are a particular problem. They cannot be dealt with satisfactorily in land fills, and although their high carbon content makes them potentially an excellent energy source, their high sulfur content makes ordinary burning of them effectively disadvantageous. Furthermore, reducing the level of pollution can consume a large portion of the energy that is generated.

There exists, therefore, a need for a process for burning combustible, sulfur containing carbonaceous materials or organic materials, such as coal, rubber and waste materials, such as municipal waste materials which does not exhibit the above mentioned disadvantages.

The present invention fulfills this need.

SUMMARY OF THE INVENTION

In accordance with one aspect of the invention there is provided an improved process for burning combustible, sulfur containing carbonaceous materials. While the process has specific applications for burning coal, it can also be used for such applications as the incineration of municipal waste and automobile tires. Its advantages over current processes are lower levels of $SO_x$, $NO_x$ and particulate emissions, lower throughput of residual solids, and higher combustion efficiencies. Further, the process itself is simple, inexpensive to install and operate, non hazardous, and easy to control.

The process according to this aspect of the invention involves introducing particles of recrystallized, metamorphic $CaCO_3$, i.e., marble, into the otherwise conventional combustion process. In this connection, it has been found that the combining of recrystallized, metamorphic $CaCO_3$ with the conventional fuel substantially improves the combustion process.

For example, the amount of $SO_2$ generated is substantially retarded and reduced in comparison to conventional combustion processes. In fact, in this aspect of the inventive process, used with no scrubbing equipment at all, it has been found to compare favorably with $SO_x$ emission levels of new power plants containing state-of-the-art combustion systems utilizing elaborate and expensive scrubbing equipment which requires increased power to operate the same; utilization of limestone in fluidized bed combustors; cyclone extraction; filtering; electrostatic precipitation; or combinations thereof, for removing particulate matter; and installation of low $NO_x$ burners or flue gas treatement with ammonia or urea sprays.

Introduction of the recrystallized, metamorphic $CaCO_3$ into the combustion zone has been found to capture much of the sulfur resident in the coal, preventing it from forming $SO_2$, $SO_3$ and $H_2S$, and instead, converting it to elemental sulfur and loose sulfur compounds which remain in the ash and can be reclaimed relatively easily. In addition, it may be possible to reclaim other valuable chemicals more easily than from conventional processes. Moreover, to the extent that recrystallized, metamorphic $CaCO_3$ acts chemically and calcifies, it is more efficient than limestone because it has a regular crystalline structure and contains fewer impurities, as well as having a higher attrition index, that is, a greater activity in the combustion zone, while retarding and reducing the formation of noxious materials exhausted to the atmosphere.

It has further been found that the presence of recrystallized, metamorphic $CaCO_3$ in the combustion zone has the effect of substantially retarding and reducing the formation of resident $NO_x$. In this regard, it is believed likely that the crystalline lattices act as molecular traps that keep the nitrogen from combining with oxygen. While it is known that in processes utilizing limestone in combustions that lower feed ratios of Ca to S will reduce $NO_x$ formation slightly, such processes are still inefficient and result in substantial gaseous $NO_x$, which is released to the atmosphere unless it is removed by utilizing the elaborate and expensive apparatus referred hereinabove. Still further, it has been found that the presence of recrystallized $CaCO_3$, metamorphic in the combustion process, according to the invention, forms a propane like gas which can either be burned in the boiler or extracted, cleaned, compressed and shipped off site.

In carrying out the inventive process, a wide variety of recrystallized, metamorphic $CaCO_3$ can be employed so long as it is crystalline in structure. However, in order to achieve acceptable retardation and reduction of $SO_x$ and $NO_x$, formation in accordance with the invention, the recrystallized, metamorphic $CaCO_3$ employed is recrystallized, metamorphic $CaCO_3$ which is not only crystalline in structure but also contains, in a range of from less than about 5% up to about 65% by weight, based on the total weight of $CaCO_3$, of other calcareous and non-calcareous materials. Furthermore, in this respect, while the recrystallized, metamorphic $CaCO_3$ may have a widely varying particle size and may be ground to produce small particles thereof, the grinding should not be so extensive that it destroys the crystalline structure. On the other hand, as a practical matter, when carrying out the process of this invention, the particles of recrystallized, metamorphic $CaCO_3$ should not be so large that the $CaCO_3$ cannot be efficiently or substantially fully utilized. The optimal t size of the recrystallized $CaCO_3$ particles which may be employed in a given combustion system is dependent upon the temperature, residence time of the crystalline $CaCO_3$ in the combustor and the type of fuel and its particle size. The particular recrystalline $CaCO_3$ particle size for use in any particular system is readily determinable by routine calculation and testing. As a practical matter, the particle size of the recrystallized, metamorphic $CaCO_3$ is in a range of an average of from about 300 sieve (ASTM) up to about 4 sieve (ASTM).

Still further, in accordance with the inventive process, less ash is produced (in the case of coal fired boilers) and less solid throughput (in the case of incinerators) takes place than with conventional processes.

In accordance with the process of the invention, the recrystallized, metamorphic $CaCO_3$ may be mixed with the carbonaceous material before it is introduced into the combustion zone, or alternatively, fed into the active combustion zone.

A small amount of iron and/or aluminum, added to the recrystallized, metamorphic $CaCO_3$, has been found to enhance the retardation and emission reduction effect of the process.

It has been found in tests that when substantial amounts of either chopped tires or municipal waste, in particular plastic waste, are added to the coal, the process maintains its effectiveness, with no discernible increase in $SO_x$, $NO_x$ or particulate emissions.

Based upon test results, when the present invention is used in a coal combustion, the emission levels, without any scrubbing or other treatment, are comparable to or better than the most modern plants with state-of-the-art emission controls. This is significantly advantageous both from the economic and the environmental points of view for a multiplicity of reasons.

For example, since the process can be installed in most systems without extensive modifications, and since marble, that is, recrystallized, metamorphic $CaCO_3$, is abundant, readily available and cheap, it allows existing plants which do not have scrubbers or other emission control equipment to drastically reduce emission levels at a fraction of the cost of switching to low sulfur coal, adding scrubbers and adding $NO_x$ treatment systems. It also allows plants that might be taken out of service because of high emissions to remain in operation at far less cost than would be required to replace them.

Still further, installing the process is simple and quick, and its installation does not require long plant shutdowns. Thus, it allows plants with high levels of emissions to reduce those levels substantially almost immediately, with corresponding benefits to the environment and to the economy.

Still further, in plants that already have state-of-the-art emission technology, it allows further reductions in emission levels, substantially improves the plants' efficiency, decreases their maintenance and prolongs their life.

Still further, by increasing efficiency, the cost of generating electric power is reduced.

Further, it opens the possibility of using greater quantities of relatively cheap higher sulfur coal, further decreasing both the cost of electric power and dependence on oil.

Still further, it substantially decreases emissions from waste treatment plants, and makes them more efficient generating operations, and since the process produces less solid residue, it reduces the load on landfills most of which are already overflowing.

In addition, the simplicity of the process permits construction of small units that can be placed close to sources of waste, thus reducing the currently high cost of transporting waste and making it far easier for small businesses to comply with waste regulations.

Further, the process can deal effectively and economically with such specific wastes as toxic or infectious hospital wastes, paper making sludge, chemical wastes, etc., by providing sealed systems that release no flue gases into the atmosphere.

In accordance with further particular aspects of the invention, there is provided a process for burning a combustible, sulfur containing carbonaceous material comprising introducing the carbonaceous material, oxygen and recrystallized, metamorphic $CaCO_3$ into a combustion zone, wherein the recrystallized, metamorphic $CaCO_3$ is introduced into the combustion zone at a feed rate in a stoichiometric ratio of CaO to $SO_2$ in a range of from about 1.0 to about 2.0 to 1.0, and retarding and reducing the formation of $SO_2$ and $NO_2$ while maintaining a temperature sufficient to ignite the oxygen and carbonaceous material in the combustion zone and exhausting the gaseous by products of combustion. In this regard, in carrying out the process of this invention, the recrystallized, metamorphic $CaCO_3$ is introduced into the combustion zone in an amount in a range of from about 5% to about 15% by weight, based on the weight of the carbonaceous material.

While the temperature in the combustion zone, in accordance with the invention, may vary within wide limits and is at least sufficient to ignite the oxygen and carbonaceous material, it is generally maintained in the combustion zone in a range of from about 1250° F. (677° C.) up to about the decomposition temperature of the recrystallized $CaCO_3$ in the combustion zone when carrying out the inventive process and is preferably in a range of from about 1250° F. (677° C.) to about 2800° F. (1538° C.).

In accordance with a further aspect of the present invention, there is provided a process for burning a combustible, sulfur containing carbonaceous material comprising introducing the carbonaceous material, oxygen and recrystallized, metamorphic $CaCO_3$ into a combustion zone and retarding and reducing the formation of $SO_2$ and $NO_2$ in the combustion zone while maintaining a temperature in the combustion zone sufficient to ignite the oxygen and carbonaceous material, and exhausting the gaseous by-products of combustion while separating unused recrystallized, metamorphic $CaCO_3$ from the gaseous by-products of combustion before exhaustion, and recycling the separated unused recrystallized, metamorphic $CaCO_3$ to the combustion zone.

In accordance with still a further aspect of the present invention, at least part of the gaseous by-products of combustion, or substantially all of the same, can be directed to end use, such as in generating electricity, for example; or alternatively, the solid by products, such as fly ash, can be directed to collection for bagging and further use. Moreover, in this connection, substantially all or part of both the solid and gaseous by products of combustion can be recycled, if desired, or directed to end uses.

In a still further alternative, in accordance with this invention, there is provided a process for burning a combustible, sulfur containing carbonaceous material, which process includes introducing the carbonaceous material, oxygen and recrystallized, metamorphic $CaCO_3$ into a combustion zone while maintaining a temperature in the combustion zone sufficient to ignite the oxygen and carbonaceous material and forming solid by products, including carbon, and gaseous by products of combustion and while reducing the carbon in the solid by products to a range of from about 20% up to about 50% by weight, based on the weight of the solid by products of combustion, including carbon, and while retarding and reducing the formation of $SO_2$ and $NO_2$ in the combustion zone and exhausting the solid by products of combustion, including carbon, and the gaseous by products of combustion. In this connection, the process may include, if desirable, separating the solid by products, including carbon, from the gaseous by products of combustion, before exhausting both the solid by products, including carbon, and gaseous by products to the atmosphere or directing both of such products to the atmosphere or to further end use, and while, if desirable, separating unused recrystallized, metamorphic $CaCO_3$ from the solid and gaseous by products of combustion and recycling the separated, unused, recrystallized metamorphic $CaCO_3$ to the combustion zone.

In accordance with the inventive process, it is generally beneficial, and the process may include introducing a small amount of either iron or aluminum, or both, into the combustion zone along with the recrystallized, metamorphic $CaCO_3$.

In accordance with this invention, the process is carried out at ambient atmospheric pressure, although it is also operable at pressures below or above the ambient t atmospheric pressure. It readily lends itself to operation at pressures below and above ambient atmospheric pressure.

In addition, the process readily lends itself to continuous, semi continuous or batch procedures.

BRIEF DESCRIPTION OF THE DRAWINGS

In order to understand the present invention more fully, reference is directed to the accompanying Drawings which are to be taken in conjunction with the following detailed description of the preferred embodiments and in which Drawings.

DETAILED DESCRIPTION OF THE PREFERRED EMBODIMENTS

Figure 1:
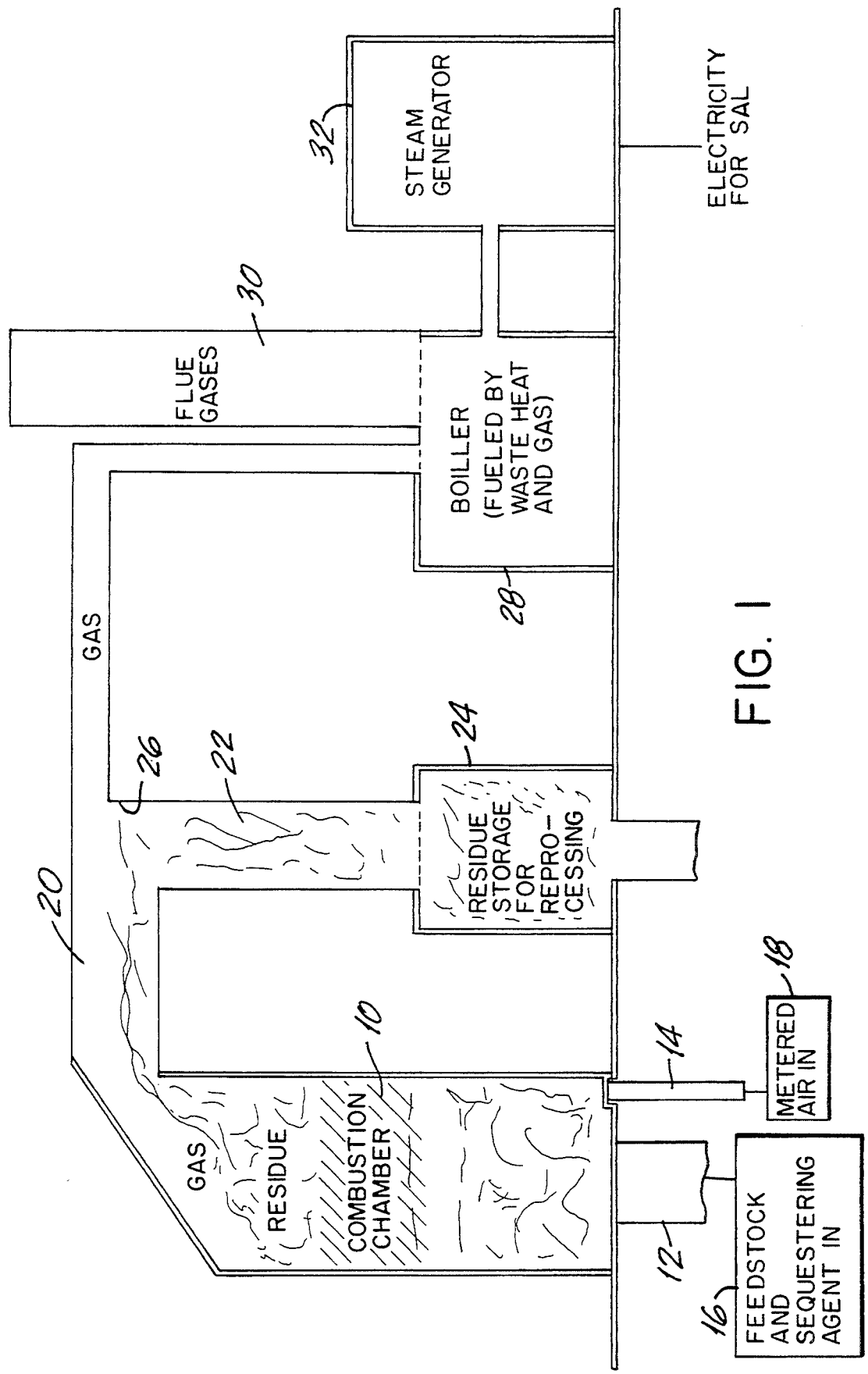
FIG. 1 is a schematic view of a stationary combustion system which utilizes the process of the present invention.

Referring to FIG. 1, a stationary combustion system suitable for carrying out the process of this invention, includes a combustion chamber 10 which includes inlets 12 and 14 for the feed stock and air, respectively, provided from feed stock 16 and metered air delivery systems 18, respectively. Combustion chamber 10 can be of any known type (stoker, grate, fluidized bed, etc.) that can receive and burn a metered mixture of fuel and sequestering agent, that is, recrystallized, metamorphic $CaCO_3$, and an even distribution of air. Delivery system 16 for introducing feed stock through inlet 12 and the system for metering air 18 through inlet 14 into the combustion chamber are well known and need not be described further here. For example, a hydraulic ram or rotating screw may be used for continuous or semi-continuous feeding of feed stock or a batch operation may also be used.

Combustion by products in the form of gases and particulates are directed along a flue 20 at the top of the combustion chamber 10 past a diverting passage 22 leading to a residue storage container 24. As shown in FIG. 1, separation of the gas and heavy particulates is effected by placing a barrier 26 in the lower portion of the flue 20, in the path of the residue, which diverts the residue down the passage 22 while allowing the gas to pass over the barrier. Gas, separated from the residue, is directed to a steam boiler 28, and then out the smokestack 30. Steam from boiler 28 is directed to a steam generator 32, to drive a turbine generator to produce, for example, electricity.

The feed stock from delivery system 16 may be coal, waste products, such as municipal waste, medical waste, paper making sludge, rubber tires, or other organic materials, or a combination of such fuels. In an exemplary embodiment where the fuel is coal, the sequestering agent, i.e., recrystallized, metamorphic $CaCO_3$ (marble) is added to coal prior to introduction into the combustion chamber 10. The marble may be used in various particle sizes dependent on fuel type and size, for example, small, sand like particles or larger, quarter inch square particles. Air is metered into the chamber 10 at a rate to maintain a temperature preferably in the range of 1500° F. (816° C.) to 1650° F. (899° C.) to deter thermal $NO_x$ formation.

By maintaining the aforesaid conditions in the combustion chamber, the sequestering agent captures the sulfur resident in the coal and converts it to elemental sulfur plus loose sulfur compounds, which can easily be reclaimed from the solid residue. The propane like gas formed in the process can either be burned in boiler 28, to further the electric generating process, or left unburned, recovered, compressed, and shipped off site.

Wastes can be utilized as feed stock either alone or mixed with coal. In the latter case, waste is simply fed into the combustion chamber with the coal and recrystallized, metamorphic $CaCO_3$.

Tests run with rubber tires or plastics added to the coal/recrystallized, metamorphic $CaCO_3$ mixture show no increase in the emissions levels of $SO_2$ or $NO_2$. Moreover, at the above operating temperatures, medical waste will be completely sterilized. It is to be understood, moreover, that a wide variety of many toxic wastes can also be processed safely in accordance with the instant inventive process.

In both waste treatment and coal only modes, the process of this invention operates at atmospheric pressure.

Figure 2:
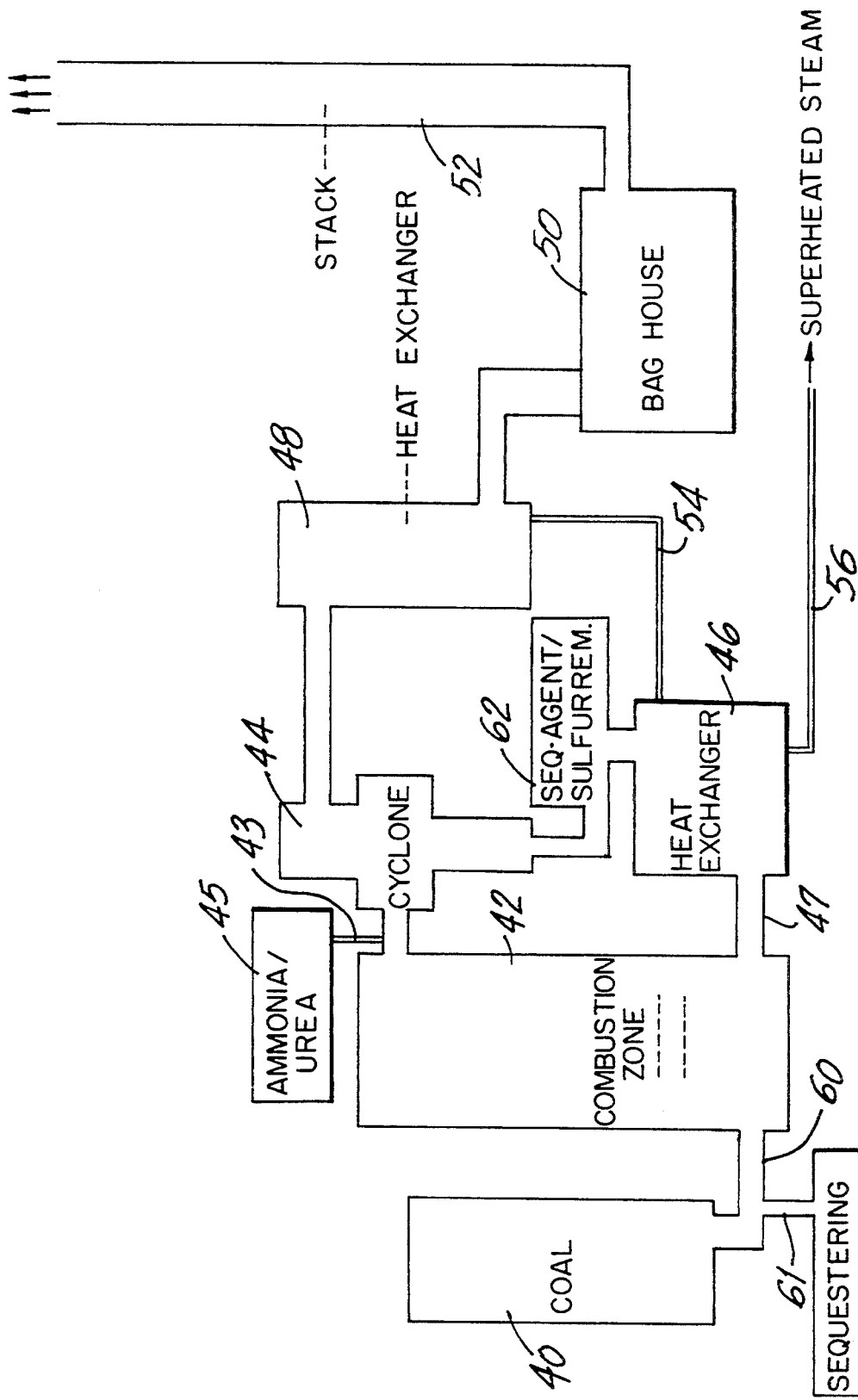
FIG. 2 is a schematic view of a fluidized bed combustion plant retrofitted to utilize the process of the present invention.

Turning now to FIG. 2 which shows schematically a state-of-the-art fluidized bed plant, as it might be modified to operate according to the present invention, the unmodified equipment includes a coal silo 40 which feeds into the bottom of a fluidized bed combustion chamber 42 through inlet 60. Recrystallized, metamorphic $CaCO_3$ is blown in through an inlet 61 and suspended above the combustion zone by air which is forced up through the floor during combustion, as conventionally employed in such systems, causing the bed to behave like a turbulent fluid.

Other existing components of the plant include a cyclone 44, for separating the larger particulates from the gases, and a pair of heat exchangers, one of which 46, is a regular heat exchanger and the other of which, 48 is a convective gas heat exchanger. As shown, ammonia or urea 45 may be injected into the gases between the combustion chamber 42 and cyclone 44 through an inlet 43.

Gases from the cyclone 44 are directed to the convective gas heat exchanger 48, which produces steam. The ash from cyclone 44 is directed through heat exchanger 46 and then returned to the combustion chamber 42 by way of inlet 47. Finally, as shown in FIG. 2, the gases leaving heat exchanger 48 are directed through a bag house 50, which includes fabric filters for collecting fine particulates, and out the stack 52.

As shown, steam from heat exchanger 48 is directed through pipe 54 to heat exchanger 46. In the heat exchanger 46, the steam from heat exchanger 48 is superheated, and then directed through pipe 56 to a turbine generator (not shown) for generating electricity.

The plant shown in FIG. 2 may be modified in accordance with the present invention to include a device to add recrystallized, metamorphic $CaCO_3$, 58, by way of inlet 61, to the fuel through the coal feed tube 60 at a predetermined ratio. The hot ash and recrystallized, metamorphic $CaCO_3$ are removed by the cyclone 44, then enter heat exchanger 46 where their heat is transferred to the steam system. The sulfur can be removed from the ash via existing techniques, such as an acid wash, as indicated by 62, and the recrystallized, metamorphic $CaCO_3$ removed in any convenient manner for re use via mechanical cleaning.

Figure 3:
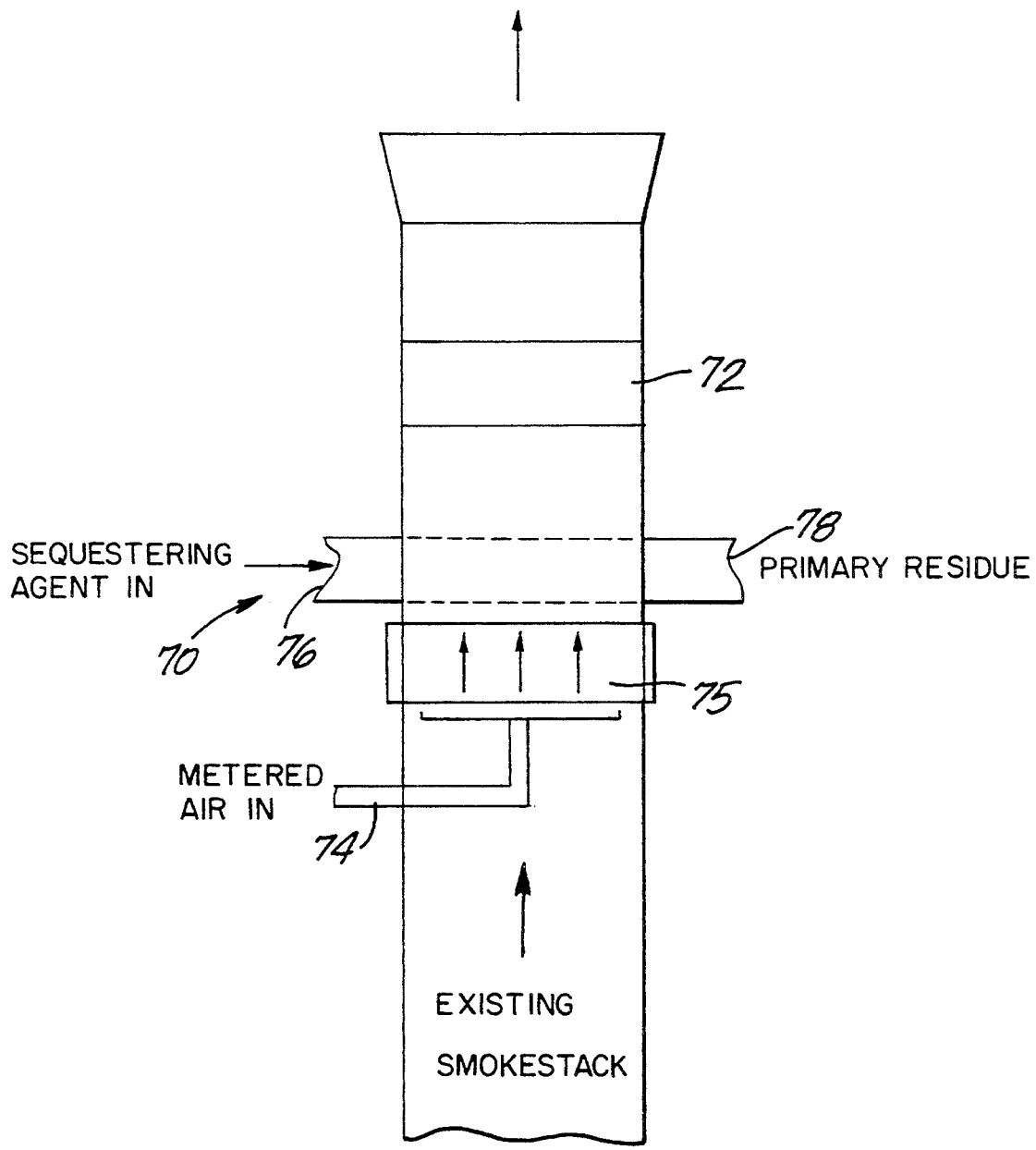
FIG. 3 is a schematic view of a post combustion flue gas scrubber utilizing an alternative process according to the present invention.

Referring to FIG. 3, a post combustion scrubber 70 according to the invention is contained within a smokestack 72. Metered air is supplied through inlet 74 to an annulus 75, which is a grate which contains recrystallized, metamorphic $CaCO_3$ but through which the flue gases can pass. Recrystallized, metamorphic $CaCO_3$ is fed in through inlet 76 and removed through outlet 78 via a simple mechanical device, such as a ram (not shown). A heat source 80 is provided to initiate combustion in the annulus 75, and the presence of the recrystallized, metamorphic $CaCO_3$ acts to remove sulfur, as above described.

Figure 4:
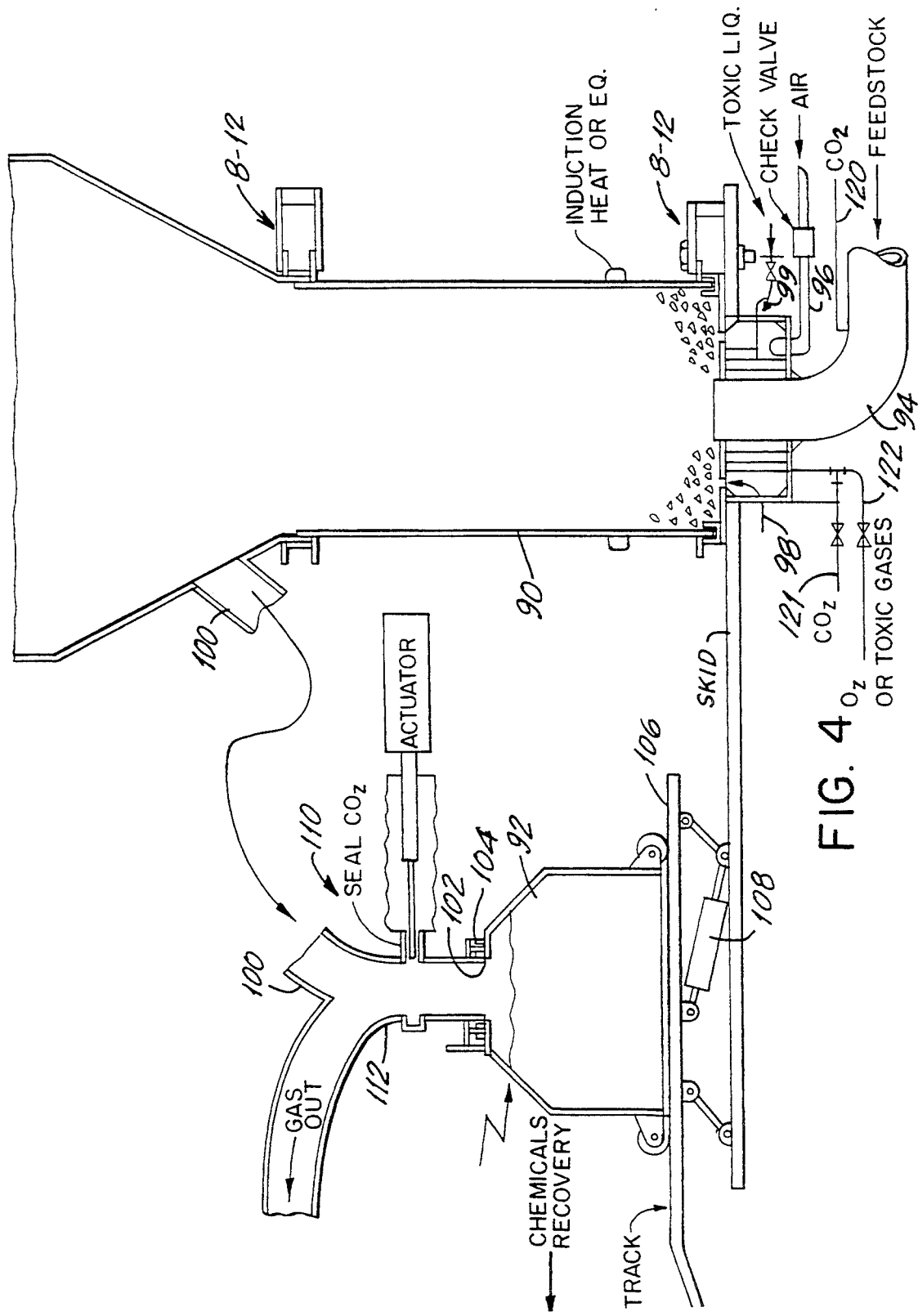
FIG. 4 is a schematic view of a mobile waste converter using the process according to the invention.

Turning now to FIG. 4, the combustion apparatus shown there includes a combustion unit 90 with a portable ash collector unit 92 for processing toxic wastes. Feed stock, which may be a combination of coal, sequestering agent, and waste material, is introduced through inlet pipe 94 into the combustion chamber 90. As shown, carbon dioxide from a convenient source (not shown) can be injected around the shaft of hydrualic actuator 110 to act as a seal and prevent toxic gases or solids from escaping to the atmosphere. Metered air for combustion is introduced through pipe 96 and annulus 98. A pipe 99 is provided at the bottom of the combustion chamber 90 for injecting liquid toxic waste to be treated.

The ash collector unit 92 is connected to the combustion chamber through pipe 100, which connects to the inlet 102 of the collector 92 by way of releasable sealed coupling 104. As shown, the ash collector unit 92 is movable on a track 106, and is raised and lowered to engage coupling 104 by a hydraulic actuator 108. The hydraulic actuator 110 mentioned above also acts to seal tube portion 112 which connects pipe 100 to coupling 104 while the ash collector unit 92 is being disconnected for movement for emptying or replacement.

Additional $CO_2$ seals 120, 121 and 123 are provided to seal off and prevent any venting of fuel or toxic materials to the atmosphere via feed stock supply tube 94, mentioned above, as well as to prevent venting of toxic gases through the toxic gases inlet 122 and also toxic liquid supply tube 99.

Figure 5:
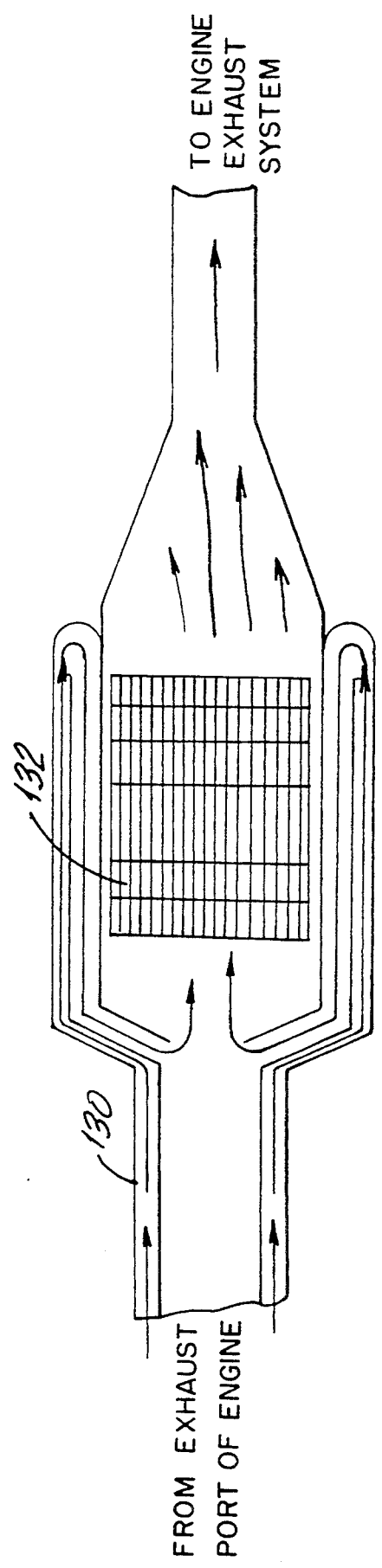
FIG. 5 is a schematic view of a converter employing the process according to the invention and adapted for the exhaust system of an internal combustion engine.

FIG. 5 illustrates another application of the invention, for treating exhaust gases from internal combustion engines. Exhaust gases from the engine (not shown) pass through a concentric outer tube 130. The outer tube directs exhaust gases about a honeycomb cartridge 132 containing carbon and recrystallized, metamorphic CaCO₃ (sequestering agent), for preheating the cartridge, and then through the honeycomb, whereas the main flow of exhaust gases enters the cartridge directly. The honeycomb calcifies $SO_2$ and reduces $NO_2$, as long as it is heated to 1250° F. (677° C.) or higher. No actual combustion is necessary. When the effectiveness of the honeycomb has dropped below acceptable levels, it is replaced as a unit. In internal combustion engines which cannot supply sufficient heat for the materials to reach 1250° F. (677° C.), an external heat source may be added to the unit. Known technologies may be used to accomplish this. Such external heat sources include but are not limited to electric resistance heaters, etc.

THE EXAMPLE

In order to further illustrate the invention, the following Examples are set forth. In the Examples, all parts and percents are by weight, unless otherwise indicated.

EXAMPLE I

Tests were run in a batch mode in a small scale apparatus of approximately 1 million BTU/hr capacity and using an average of 24 pounds of fuel per batch. Three grades of coal were tested: low sulfur coal (less than 0.5% sulfur); medium sulfur coal (1.6% sulfur); and high sulfur coal (3.2% sulfur).

The low sulfur coal, also known as stove coal, was selected because it is used as an EPA benchmark in that it can be burned without scrubbing. The medium sulfur coal tested is the same as that used in an existing coal fired, circulating fluidized bed power plant having emission control equipment, and thus test results from the present process could be compared with measured plant emissions from a state of the art facility. The high sulfur coal, also known as Federal #2, was selected to determine the ability of the present process to deal with relatively dirty coal.

In each case, coal was burned first without the recrystallized, metamorphic $CaCO_3$, and then with recrystallized, metamorphic $CaCO_3$ mixed with the feed stock. The amount of recrystallized, metamorphic $CaCO_3$ varied from 5% to 15% by weight of the coal.

Stack temperatures, taken approximately 4 feet above the bed, ranged from 900° F. (483° C.) to about 1100° F. (594° C). Bed temperatures were in the 1400° F. (760° C.) to 1600° F. (871° C.) range. Air flow was set at the levels necessary to achieve these temperatures. $SO_2$ and $NO_2$ emissions were analyzed by means of a Gastec detector tube tester.

The results of the tests were as follows:

| Type of Coal | w/o additive | with additive |
|---|---|---|
| $So_x$ | | |
| Low sulfur | 200 ppm | 75 ppm |
| Medium sulfur | 400 ppm | 100 ppm |
| High sulfur | 800 ppm | 200 ppm |
| $NO_x$ | | |
| Medium sulfur | 100 ppm | 20 ppm |
| High sulfur | 200 ppm | 75 ppm |

In the above tests, 10% by weight, based on the weight of the fuel of additive, that is recrystallized, metamorphic $CaCO_3$ containing 35% by weight of crystalline $CaCO_3$ and 65% by weight of other calcerous and non calcerous materials, based on the total weight of $CaCO_3$, was used with the low sulfur coal sample. The marble had an average particle size of ¼ in² to ⅜ in².

In the tests of the medium and high sulfur coals, the weight percentage of the same additive was increased to 12% and 15%, respectively.

It should be noted that high sulfur coal, burned in accordance with the process of the present invention, produced sulfur emissions as low as conventional combustion of low sulfur coal. Moreover, $NO_2$ emissions were also surprisingly low using the sequestering additive. This demonstrates that the process according to the invention, without any scrubbing or other pollution control equipment, can meet the same level of $SO_2$ emissions as plants which have expensive pollution control equipment, and can be expected to produce much lower levels than currently possible if such equipment is added.

Moreover, the $SO_2$ emission levels attained according to the present process, i.e., without using scrubbers or other pollution control equipment, were within 15% of the circulating fluidized bed plant mentioned above. The $NO_2$ emissions were more than 50% below the emissions from the operating plant. Thus, the invention reduces emission levels, without scrubbing, to the same or lower levels as existing systems with scrubbing.

Two additional series of tests were run with between 10% and 20% of the feed stock comprising, in the respective series of tests, (1) residential waste, particularly plastics, and (2) chopped up rubber tires. In both cases reduced $SO_2$ or $NO_2$ emission levels were not measurably affected when compared with the reduced levels set forth above in which the various coals were used as the sole carbonaceous materials.

In repetitive test trials, approximately 500 in number, the reduced levels of $SO_2$ and $NO_2$ emissions were consistent with the above results with a margin of error of ±10%.

Additional tests were run with iron filings and aluminum filings (less than ½ or 1% by weight of the marble) as additional additives to the marble. The level of $SO_2$ and $NO_2$ emissions were measureably but only slightly reduced.

EXAMPLE II

In an industrial scale apparatus employing a circulating fluidized bed converter, as shown in FIG. 2, the following test was run as a continuous process procedure.

Initially, the data from a commercial power plant processing 0.95% sulfur coal, pulverized to between 200 and 300 sieve (ASTM) burned in the combustor along with a sufficient amount of limestone, also pulverized to 200 to 300 sieve (ASTM), to provide a stochiometric ratio of CaO to S of 2.41 to 1 was utilized for comparative purposes. Over the 2½ year period, the $SO_2$ formation resulting from the plant operation at temperatures of 1500° F. (816° C.) to 1550° F. (844° C.) ranged from 115 ppm to 96 ppm and $NO_2$ formation ranged from 50 ppm to 75 ppm. While such levels of $SO_2$ and $NO_2$ are within currently permissible Governmental Regulatory Specifications, further Governmental Regulatory Specifications will require $NO_2$ levels to be reduced below those which are currently permitted and, moreover, any introduction of a more efficient sorbent which allows further reduction of $NO_2$ emission levels and reduction of CaO to S ratios will also increase plant efficiency, as well as permitting such large scale operations to use high sulfur coals while maintaining acceptable levels of $SO_2$ and $NO_2$, thus increasing efficiency.

Figure 6:
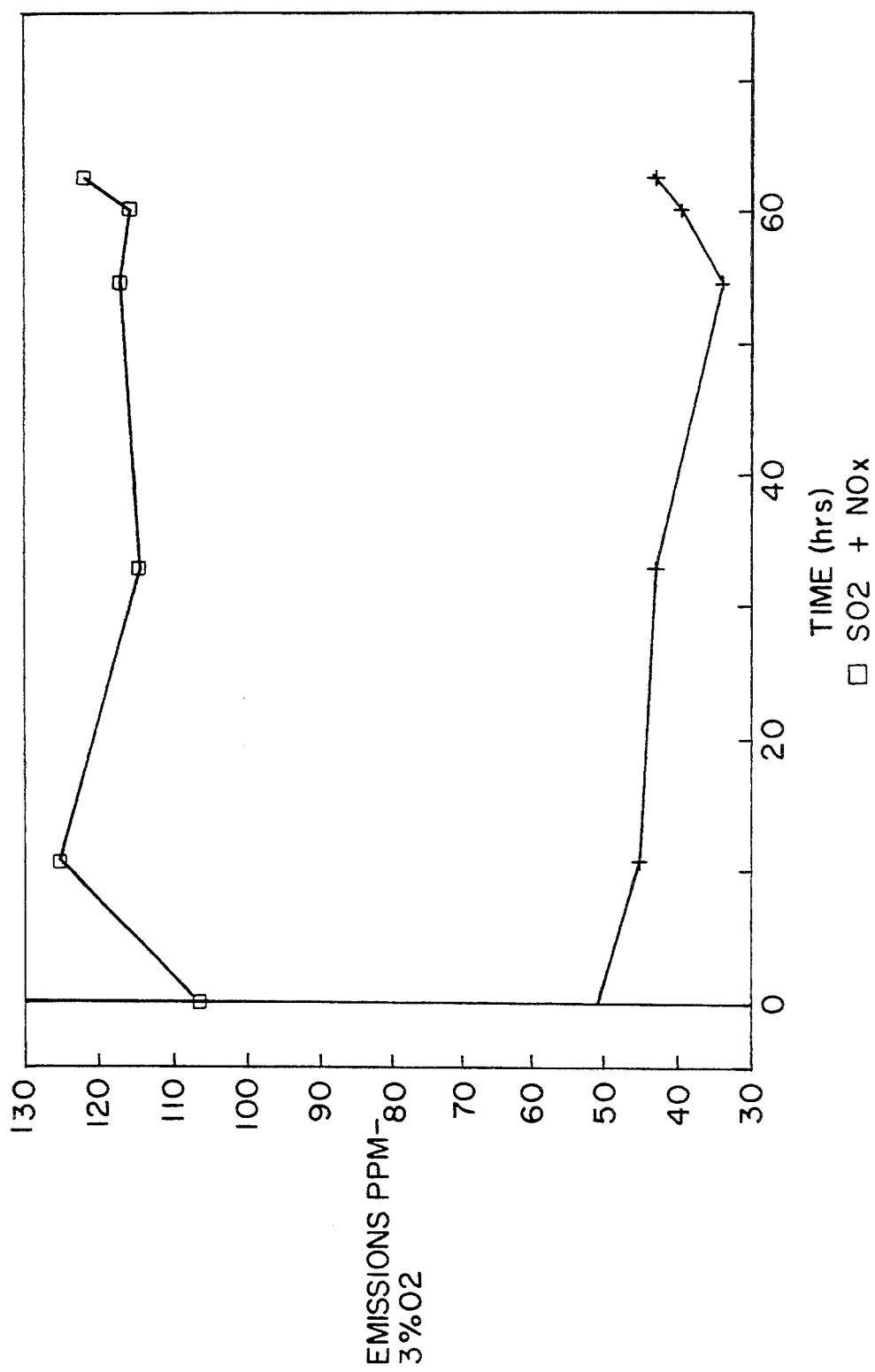
FIG. 6 is a graphical depiction of a process according to this invention as carried out in a circulating Fluidized Bed Convertor which was retrofitted to employ recrystallized, metamorphic $CaCO_3$ and which was originally operated with limestone and shows that the recrystallized, metamorphic $CaCO_3$ works in the system to reduce $SO_2$ emissions at lower feed ratios than limestone, as well as achieving a reduction in $NO_2$ emissions.

For purposes of decreasing the NO emission levels and increasing the efficiency of the plant operations, the sorbent of the present invention, that is the sequesterant, was fed to the combustion of the plant apparatus in place of limestone for a period of approximately 3½ days. As may be seen from FIG. 6, a recrystallized, metamorphic $CaCO_3$ containing 65% by weight, based on the total weight of the $CaCO_3$ of other calcerous and non calcerous materials, used as the sorbent in place of limestone in a stochiometric ratio of between 1.3 to 1.55 to 1 reduced the $NO_2$ emissions to a range of from 35 ppm to 50 ppm in the flue gases exhausted to the atmosphere. In addition, at such Ca to S ratios, the $SO_2$ emission remained within the currently acceptable levels required by Governmental Regulatory Specifications At the same time, chemical analysis of the ash samples indicated that the unburned carbon levels in the fly ash was reduced to an amount in a range of from 20% to 50% and the need for installation of low $NO_2$ burners and expensive ash recycling units was unnecessary The reduction of carbon in the fly ash and bed ash is set forth in the following Table which shows routine chemical analysis of the fly ash and bed as using limestone and the sequesterant of this invention.

TABLE

|  | Limestone Sequesterant | Sequesterant of this case |
|---|---|---|
| Fly ash | 15.9% | 10.5% |
|  |  | 7.6% |
|  |  | 12.9% |
|  |  | 8.7% |
|  |  | 9.8% |
| Bed ash | 0.5% | 0.8% |
|  |  | 0.5% |
|  |  | 1.3% |
|  |  | 0.5% |
|  |  | 0.4% |

The above data show that use of the sequesterant of this case reduces the carbon level in the fly ash to an amount in a range of 20% to 50% by weight, based on the total weight of the fly ash and limestone as the sequesterant achieved, at best, a 15.9% unburned carbon level in the fly ash. Thus, the sequesterant of the instant case reduced the level to an amount in a range of from 12.9% to 7.6%, a 20% to 50% reduction, as compared to the limestone sequesterant.

The foregoing represent preferred embodiments of the invention. Variations and modifications of the foregoing processes, and the apparatus that may be utilized to carry out such processes, will be apparent to persons skilled in the art, without departing from the inventive concepts disclosed herein. For example, rather than adding the recrystallized, metamorphic $CaCO_3$ to the fuel, it may be introduced into the combustion zone in other ways, such as by spraying it on the combustion bed, introducing it above the bed, or any combination thereof. The preferred methodology may vary from case to case. All such modifications and variations are intended to be within the scope of the invention, as defined in the appended claims.

What is claimed is:

1. A process for burning a combustible, sulfur-containing carbonaceous material, while reducing the formation of noxious materials exhausted to the atmosphere comprising introducing said carbonaceous material, oxygen and marble having a particle size in the range of from about 300 sieve up to about 4 sieve into a combustion zone, said marble being introduced at a feed rate in a stoichiometric ratio of CaO to S in a range of from about 1.0 to about 2.0 to 1.0, maintaining a temperature sufficient to ignite said oxygen and said carbonaceous material in said combustion zone and forming solid by-products of combustion and retarding and reducing simultaneously the formation of $SO_x$ and $NO_x$, wherein at least 75% of $SO_x$ emission is removed and wherein $NO_x$ emission are more than 50% below the $NO_x$ emissions using limestone and reducing carbon in said solid by-products to a range of from about 20% up to about 50% by weight of the carbon content using limestone, based on the weight of said solid by-products, including carbon, and exhausting the gaseous by-products of combustion.

2. A process according to claim 1, wherein marble, metamorphic is added in an amount of about 5% to about 15% by weight of the carbonaceous material.

3. A process according to claim 1 including maintaining a temperature in a range of from about 1250° F. (677° C.) up to about the decomposition temperature of the marble, metamorphic in the combustion zone.

4. A process according to claim 1 including maintaining a temperature in a range of from about 1250° F. (677° C.) up to about 2800° F. (1583° C.) in the combustion zone.

5. A process according to claim 1 wherein the carbonaceous material is coal.

6. A process according to claim 1 wherein the marble, metamorphic is mixed with the carbonaceous prior to introducing said carbonaceous material into the combustion zone.

7. A process according to claim 1 wherein the carbonaceous material comprises tires.

8. A process according to claim 1 including introducing iron into the combustion zone along with the marble, metamorphic.

9. A process according to claim 1 including introducing aluminum into the combustion zone along with the marble, metamorphic.

10. A process according to claim 1 including separating the solid by-products, including carbon, from said gaseous by-products of combustion, before exhausting said gaseous by-products to the atmosphere and recovering said solid by-products, including carbon, for further use.

11. A process according to claim 1 including recovering the bottom ash for further use.

12. A process according to claim 1 including separating unused recrystallized, metamorphic marble from the gaseous by products of combustion before exhaustion, and recycling the separated unused marble, metamorphic to the combustion zone.

* * * * *